(12) United States Patent
Prins

(10) Patent No.: US 10,834,475 B1
(45) Date of Patent: Nov. 10, 2020

(54) MANAGING ENCODING PARAMETERS

(71) Applicant: Amazon Technologies, Inc., Seattle, WA (US)

(72) Inventor: Timothy Prins, Hillsboro, OR (US)

(73) Assignee: Amazon Technologies, Inc., Seattle, WA (US)

( * ) Notice: Subject to any disclaimer, the term of this patent is extended or adjusted under 35 U.S.C. 154(b) by 203 days.

(21) Appl. No.: 15/922,503

(22) Filed: Mar. 15, 2018

(51) Int. Cl.
*H04N 21/8358* (2011.01)
*G06T 1/00* (2006.01)

(52) U.S. Cl.
CPC ....... *H04N 21/8358* (2013.01); *G06T 1/0028* (2013.01); *G06T 2201/0052* (2013.01)

(58) Field of Classification Search
CPC .............. H04N 21/8358; G06T 1/0028; G06T 2201/0052
See application file for complete search history.

(56) References Cited

U.S. PATENT DOCUMENTS

| | | | |
|---|---|---|---|
| 9,426,018 B1* | 8/2016 | Truax | H04L 29/06027 |
| 10,236,031 B1* | 3/2019 | Gurijala | G11B 20/10527 |
| 2006/0095401 A1* | 5/2006 | Krikorian | H04N 21/23406 |
| 2011/0019870 A1* | 1/2011 | Ballocca | H04N 7/162 382/100 |
| 2013/0343450 A1* | 12/2013 | Solka | H04N 21/2353 375/240.03 |
| 2016/0378720 A1* | 12/2016 | Bacus | G06F 17/211 715/251 |
| 2017/0118537 A1* | 4/2017 | Stransky-Heilkron | G06F 21/16 |
| 2018/0219934 A1* | 8/2018 | Gomes | H04L 65/607 |
| 2018/0343468 A1* | 11/2018 | Harrell | H04N 19/103 |

* cited by examiner

*Primary Examiner* — J. Brant Murphy
(74) *Attorney, Agent, or Firm* — Knobbe, Martens, Olson & Bear, LLP

(57) ABSTRACT

A video packaging and origination service can include one or more encoder components that receive content for encoding and transmitting to requesting entities. Responsive to a request for content, an encoder can be configured with a set of adjustable parameters that depend on the specific format of encoding. To implement watermarking, the encoder dynamically modifies or biases one or more of the parameter values such that the modified parameter values can represent watermarking data.

20 Claims, 5 Drawing Sheets

MANAGING ENCODING PARAMETERS

BACKGROUND

Generally described, computing devices and communication networks can be utilized to exchange information. In a common application, a computing device can request content from another computing device via the communication network. For example, a user at a personal computing device can utilize a browser application to request a content page (e.g., a network page, a Web page, etc.) from a server computing device via a network (e.g., the Internet). In such embodiments, the user computing device can be referred to as a client computing device and the server computing device can be referred to as a content provider.

Content providers are generally motivated to provide requested content to client computing devices often with consideration of image quality of the requested content as reconstructed at the client computing device. Artifacts resulting from the encoding process can lead to degradation of content image when it is reconstructed at the client computing device.

Some content providers attempt to facilitate the delivery of requested content through the utilization of a content delivery network ("CDN") service provider. As with content providers, CDN service providers are also generally motivated to provide requested content to client computing devices often with consideration of image quality of the requested content to the client computing device. Accordingly, CDN service providers often consider image quality to generally improve the quality of delivery service.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
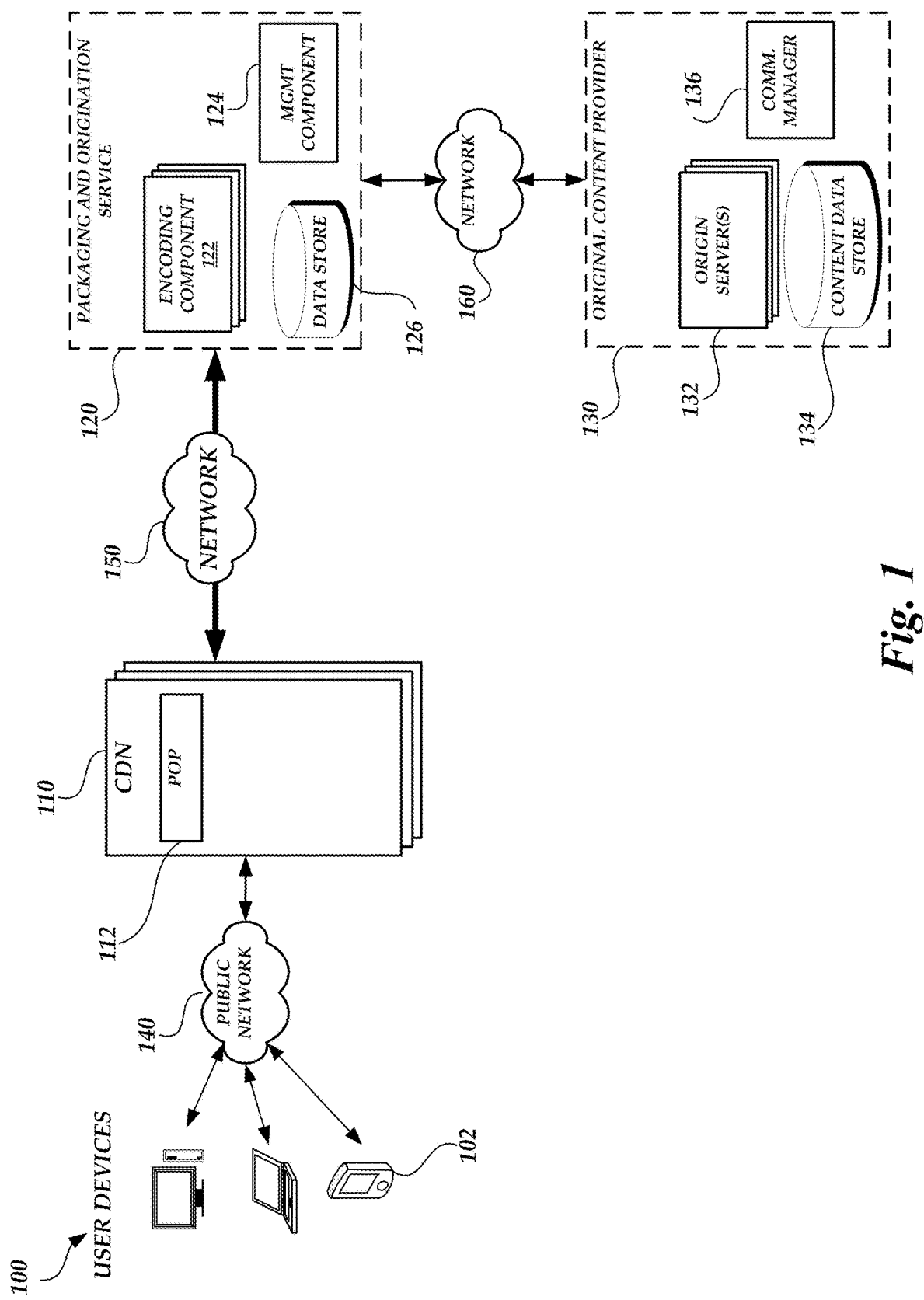
FIG. 1 is a block diagram of a communication management environment that includes one or more client devices, one or more edge locations, and a video packaging system in accordance with some embodiments.

Generally described, content providers can provide content to requesting users. With regard to video content, a content provider can implement a video packaging and origination service that is able to deliver video content to requesting users. Still further, the content provider or packaging and origination service can utilize a CDN or other content delivery component to deliver video content to requesting users or client computing devices utilizing streaming transmissions in accordance with one of a range of communication protocols, such as the hypertext transfer protocol ("HTTP").

Content providers can organize requested content, such as a video file, into multiple segments that are then transmitted to requesting devices segment by segment. For example, in a video stream, each segmented portion typically accounts for 2-10 seconds of video rendered on a receiving device. Each video segment can be encoded by a video packaging and origination service according to an encoding format utilized by the encoder to generate the output stream.

Each video segment can be encoded according to a defined bitrate and format, which generally defines the number of bits of data that are encoded over a measured amount of time and the specific software algorithm and resulting content representation format utilized to encode the data for transmission. For video files, bitrates are typically measured according to how many kilobits or megabits of data over a second of time. By way of example, a data file that corresponds to 1 megabyte of video data encoded in one second would be considered to have an encoding bitrate of 8 mbps (8 megabits per second) while a lower definition video file that corresponds to 45 kilobytes of video data processed in one second would be considered to have an encoding bitrate of 360 kbps (360 kilobits per second).

In some basic implementations, a client computing device can simply request content having a fixed encoding rate or have a fixed encoding rate selected in response to a streaming content request. Such a fixed encoding rate approach can be deficient in facilitating variance of the encoding bitrate (both positive and negative) based on factors, such as network bandwidth, client computing device utilization, quality demands, and the like. In addition to the association of the encoding bitrate, video segments can be further defined by associating the encoding bitrate with the encoding format utilized by the encoder to generate the output stream. The encoding format can correspond to a content representation format for storage or transmission of video content (such as in a data file or bitstream). Examples of encoding formats include but not limited to the motion pictures expert group ("MPEG") MPEG-2 Part 2, MPEG-4 Part 2, H.264 (MPEG-4 Part 10), high efficiency video coding ("HEVC"), Theora, RealVideo RV40, VP9, and AOMedia Video 1 ("AV1"), and the like.

In some encoding formats, such as H.264, the encoded content stream corresponds to a set of frame of data that includes a set of keyframes or i-frames. Each individual keyframe or i-frame represents a full picture of the content and are included in spaced apart intervals in an encoded content stream. In between each keyframe, the encoded content stream includes differential or predicted frames that only include a small fragment of the keyframe and represent the differential in the sequential set of images from the original content to be encoded. Generally described, one parameter related to encoding content is generally referred to as keyframe interval and corresponds to the frequency in which keyframes are included in encoded content and correspondingly, the number of differential or partial frames in between each keyframe. Another parameter related to encoding content is generally referred to as framerate and corresponds to the total number of frames (keyframes and differential frames) transmitted in a defined period of time. In one example, content encoded with a higher keyframe interval may correspond to a higher visual quality by having more full picture frames, but would also correspond to more data. In another example, content encoded with a lower framerate may correspond to a lower visual quality because there would be less frames of data, but would also correspond to less data.

In other embodiments, it may be possible for the content provider to facilitate variable bit rate encoding to enable for variances in the encoding bitrates of individual segments of a video file. In such embodiments, the content provider can generate multiple encoded bitrate versions or combinations of encoded bitrates and formats of individual video file segments. The content provider can then make at least a subset of the multiple bitrate encoded versions available to clients responsive to a request for a particular encoded bitrate version and format. Generally, a content provider can generate a catalog identifying the video segments and encoded bitrates for each identified video segment. The catalog can be written into a manifest file that is provided to individual client computing devices that have requested the video file. Thereafter, each client computing devices, through a respective software application, can request individual video segments according to the available encoded bitrates and formats as published in the manifest file.

By way of illustrative example, a client computing device may request the first video segment at a lower or default bitrate or at the lowest available bitrate. For ease of discussion, the encoding format may also be requested with the encoding bitrate or the encoding format may be pre-defined. With continued reference to the illustrative example, if the requested segments are received and the software application determines that a download speed exceeds the requested bitrate of the received segment, the next requested segment can be requested at a higher bitrate. The process can continue until the software application reaches a maximum bitrate (e.g., due to financial considerations or other controls) or until the requested bitrate matches the available download bandwidth. Still further, if during the transmission of the video file, the bandwidth conditions change, the software application can request a different encoding bitrate based on the changed conditions.

Content providers generating the original content streams provided to a video packaging and origination service can require some form of watermarking or digital fingerprinting for content streamed to user devices. More specifically, in situations in which content is redistributed without authorization from a content provider by a customer (or in a manner not allowed by the content provider), content providers typically require some form of information included in the content streams that facilitates the identification of a possible source of such redistribution. One approach to including digital watermarking in streamed content corresponds to modification of the content prior to encoding. More specifically, a video packaging and origination service can utilize a service that receives video content to be encoded, modifies the video content in some manner, and returns the modified content for encoding. For example, a video packaging and origination service can interface with a third-party service or library that modifies a portion of the video pixel data by inserting information or altering the appearance of the content. The third-party service returns the modified content for encoding by the video packaging and origination service. Although such approaches can facilitate some form of watermarking, modification of the encoded file can result in additional financial cost and resource consumption to utilize a service to modify the content to be encoded. Additionally, the modified content has the potential to inject visual distortions that may be discernable to consumers at the user devices.

Aspects of the present application correspond to a content streaming system and methodology for managing encoder components. More specifically, in an illustrative embodiment, a video packaging and origination service can include one or more encoder components that receive content for encoding and transmit encoded content streams to requesting entities. Illustratively, the content can be provided by an original content provider, which configures the video packaging and origination service to encode one or more content streams in response to requests for the content streams. Individual encoder components receive or access content and prepare to encode the content according to one or more encoding profiles defined by an encoding bitrate and format.

During the operation of the encoder components or responsive to a request for encoded content streams, individual encoders or a management service associated with the video packaging and origination service can receive information related to the modification of encoding parameters that will be representative of watermark data. Responsive to received information, the encoder components or management service can determine and configure encoder components parameters that will be dynamically modified during the encoding process.

Once the encoder component is instantiated and configured with the set of encoder parameters, the encoder component receives content for streaming, encodes content and generates encoded content streams that are transmitted to requesting entities, such as user devices or content delivery network service providers. During the encoding process, the encoders utilize the configurations to dynamical change or bias encoding parameters of at least one frame. The dynamic change or bias correspond to arriving at one or more different parameters than would have been otherwise selected or generated by the encoder. By way of illustrative example, the encoder can adjust a filter parameter, such as specified the H.264 or H.265 encoding format, such that a biased filtering value can be detected in subsequent analysis of the encoded data. In another example, the encoder can change a block type decisions or deblocking strengths in the HEVC encoding format such that a biased block type decision or deblocking strength value can be detected in subsequent analysis of the encoded data.

Illustratively, the modification or biased values can be recorded or acknowledged by the encoder or management service for later comparison. Subsequent to transmission, if the source of a distribution or redistribution is required, the management service can process the encoded content, such as by utilizing machine learning algorithms, and identify the dynamically modified or biased parameters in the encoded content. The management service can then look up modification configuration or recorded encoding parameter values to identify the user device that received the particular encoded content.

By facilitating the modification of encoding parameters, aspects of the present application facilitate watermarking in content encoding without incurring the additional financial and computational expense in generating modified content. Additionally, because the modification of encoding parameters does not typically generate the same artifacts in the encoded content relative to approaches in which the content to be encoded is modified, the present application can improve the performance of a video packaging and origination service.

FIG. 1 illustrates a general content delivery environment 100 for delivering content from original content providers to user devices. The content delivery environment 100 includes a plurality of user devices 102 utilized by individual users, generally referred to as client computing devices, to request streaming content from a video packaging and origination service 120. Illustratively, the video packaging and origination service 120 indexes a collection of source video content (either live streaming or file-based video-on-demand) and delivers it to clients via a wide range of communication protocols such as HTTP Live Streaming ("HLS"), Dynamic Adaptive Streaming over HTTP ("DASH"), HTTP Dynamic Streaming ("HDS"), Real Time Messaging Protocol ("RTMP"), and the like. Based on consumer demand, a video packaging and origination service 120 can also provide advanced video transmission features such as just-in-time packaging of video content, digital rights management ("DRM") encryption, time-shifting, bitrate selection, catch up TV, and more. The content can be illustratively provided by one or more origin sources, such as original content provider 130.

User devices 102 may include any number of different computing devices capable of communicating with the networks 140, 150, 160, via a direct connection or via an intermediary. For example, individual accessing computing devices may correspond to a laptop or tablet computer, personal computer, wearable computer, server, personal digital assistant ("PDA"), hybrid PDA/mobile phone, mobile phone, electronic book reader, set-top box, camera, appliance, controller, digital media player, and the like. Each client computing device 102 may optionally include one or more data stores (not shown in FIG. 1) including various applications or computer-executable instructions, such as web browsers, used to implement the embodiments disclosed herein. Illustrative components of a user device 102 will be described with regard to FIG. 2.

In some embodiments, a CDN service provider 110 may include multiple edge locations 112 from which a user device 102 can retrieve content. Individual edge locations 112 may be referred to herein as a point of presence ("POP"), where a POP is intended to refer to any collection of related computing devices utilized to implement functionality on behalf of one or many providers. POPs are generally associated with a specific geographic location in which the computing devices implementing the POP are located, or with a region serviced by the POP. Individual POPS 112 can include one or more information processing components, data stores and other network equipment for facilitating the delivery of encoded content streams to user devices 102.

Networks 140, 150, 160 may be any wired network, wireless network, or combination thereof. In addition, the networks 140, 150, 160 may be a personal area network, local area network, wide area network, cable network, satellite network, cellular telephone network, or combination thereof. In the example environment of FIG. 1, network 140 is a global area network ("GAN"), such as the Internet. Protocols and components for communicating via the other aforementioned types of communication networks are well known to those skilled in the art of computer communications and thus, need not be described in more detail herein. While each of the user devices 102 and CDN service provider 110 are depicted as having a single connection to the network 140, individual components of the user devices 102 and CDN service provider 110 may be connected to the network 140 at disparate points. Accordingly, communication times and capabilities may vary between the components of FIG. 1. Likewise, although FIG. 1 is illustrated as having three separate networks 140, 150, 160, one skilled in the relevant art will appreciate that the video packaging and origination service 120 may utilize any number of networks. For purposes of the present application, network 140 can be considered to have more limited bandwidth that may limit the delivery of content streams in accordance with traditional encoding approaches.

The original content providers 130 may include one or more servers 132 for delivering content, a data store 134 for maintaining content and a communication manager 136 for facilitating communications to the video packaging and origination service 120 over network° 160.

In accordance with embodiments, the video packaging and origination service 120 includes a set of encoding components 122 for receiving content provided by the original content providers 130 (or other source) and processing the content to generate a set of encoded video segments available for delivery. The video packaging and origination service 120 can further include a data store 126 for maintaining collected watermarking information, such as configuration changes implemented by the encoding components 122. The video packaging and origination service 120 is further associated with a management component 124 to facilitate in some embodiments the determination of encoder component parameters and to dynamically determine encoder parameters for purposes of watermarking as described herein. The management component 124 can delegate at least some portion of the identified functionality to the encoder components themselves or otherwise be omitted.

It will be appreciated by those skilled in the art that the video packaging and origination service 120 and information processing component 114 may have fewer or greater components than are illustrated in FIG. 1. Thus, the depiction of the video packaging and origination service 120 and the information processing component 114 in FIG. 1 should be taken as illustrative. For example, in some embodiments, components of the video packaging and origination service 120 and the processing component 114 may be executed by one more virtual machines implemented in a hosted computing environment. A hosted computing environment may include one or more rapidly provisioned and released computing resources, which computing resources may include computing, networking or storage devices.

Figure 2:
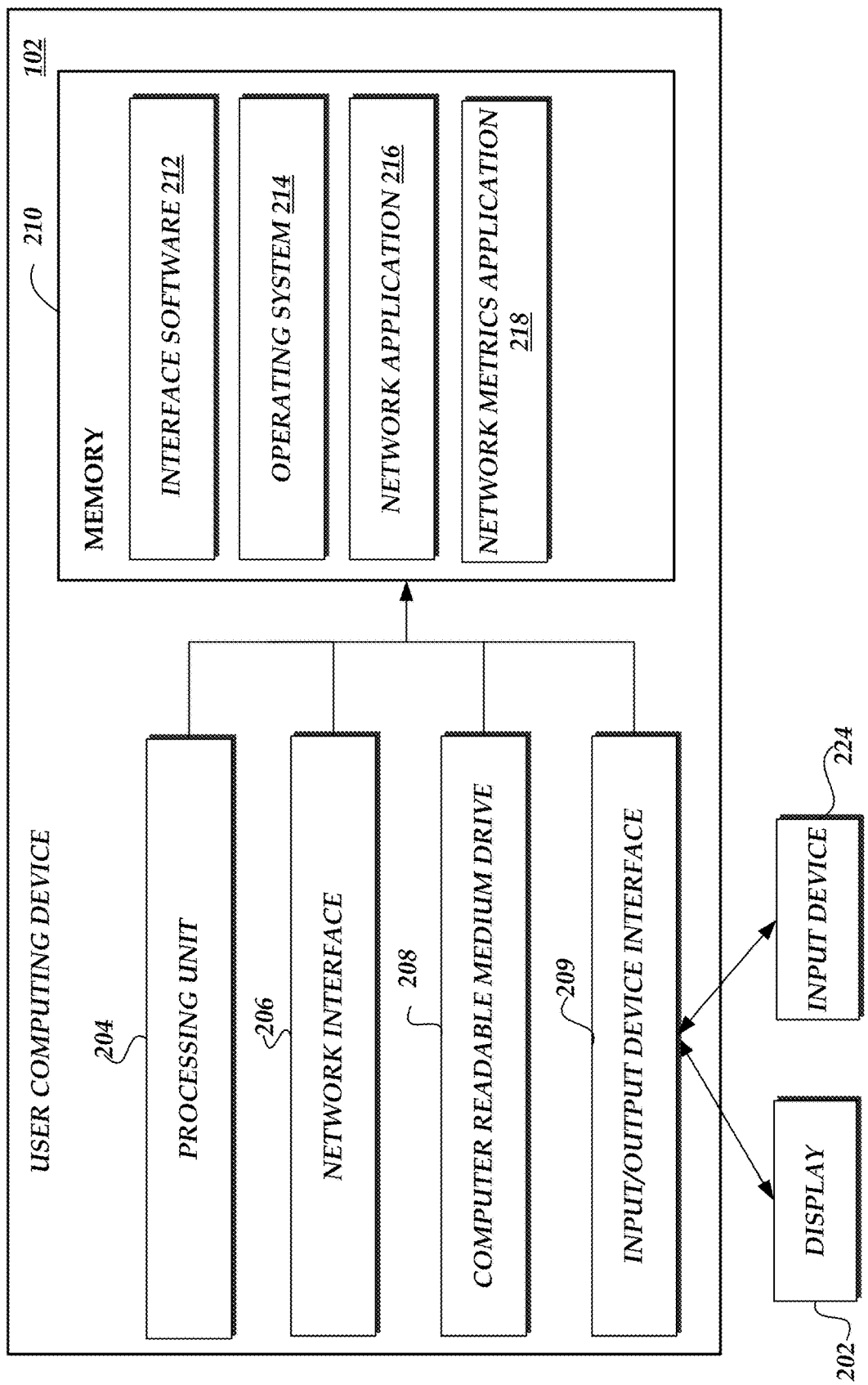
FIG. 2 is a block diagram of illustrative components of a client computing device configured to remotely process content in accordance with some embodiments.

FIG. 2 depicts one embodiment of an architecture of an illustrative user device 102 that can generate content requests in accordance with the present application. The general architecture of the user computing device 102 depicted in FIG. 2 includes an arrangement of computer hardware and software components that may be used to implement aspects of the present disclosure. As illustrated, the user computing device 102 includes a processing unit 204, a network interface 206, a computer readable medium drive 208, an input/output device interface 209, an optional display 202, and an input device 224, all of which may communicate with one another by way of a communication bus.

The network interface 206 may provide connectivity to one or more networks or computing systems, such as the network 140 of FIG. 1. The processing unit 204 may thus receive information and instructions from other computing systems or services via a network. The processing unit 204 may also communicate to and from memory 210 and further provide output information for an optional display 202 via the input/output device interface 209. The input/output device interface 209 may also accept input from the optional input device 224, such as a keyboard, mouse, digital pen, etc. In some embodiments, the user computing device 102 may include more (or fewer) components than those shown in FIG. 2.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the user computing device 102. The memory 210 may further include computer program instructions and other information for implementing aspects of the present disclosure. For example, in one embodiment, the memory 210 includes interface software 212 for requesting and receiving content from the video packaging and origination service 120 via the CDN service provider 110. For example, in one embodiment, the memory 210 includes a network application 216, such as browser application or media player, for accessing content, decoding the encoded content, and communicating with the CDN service provider 110.

Figure 3:
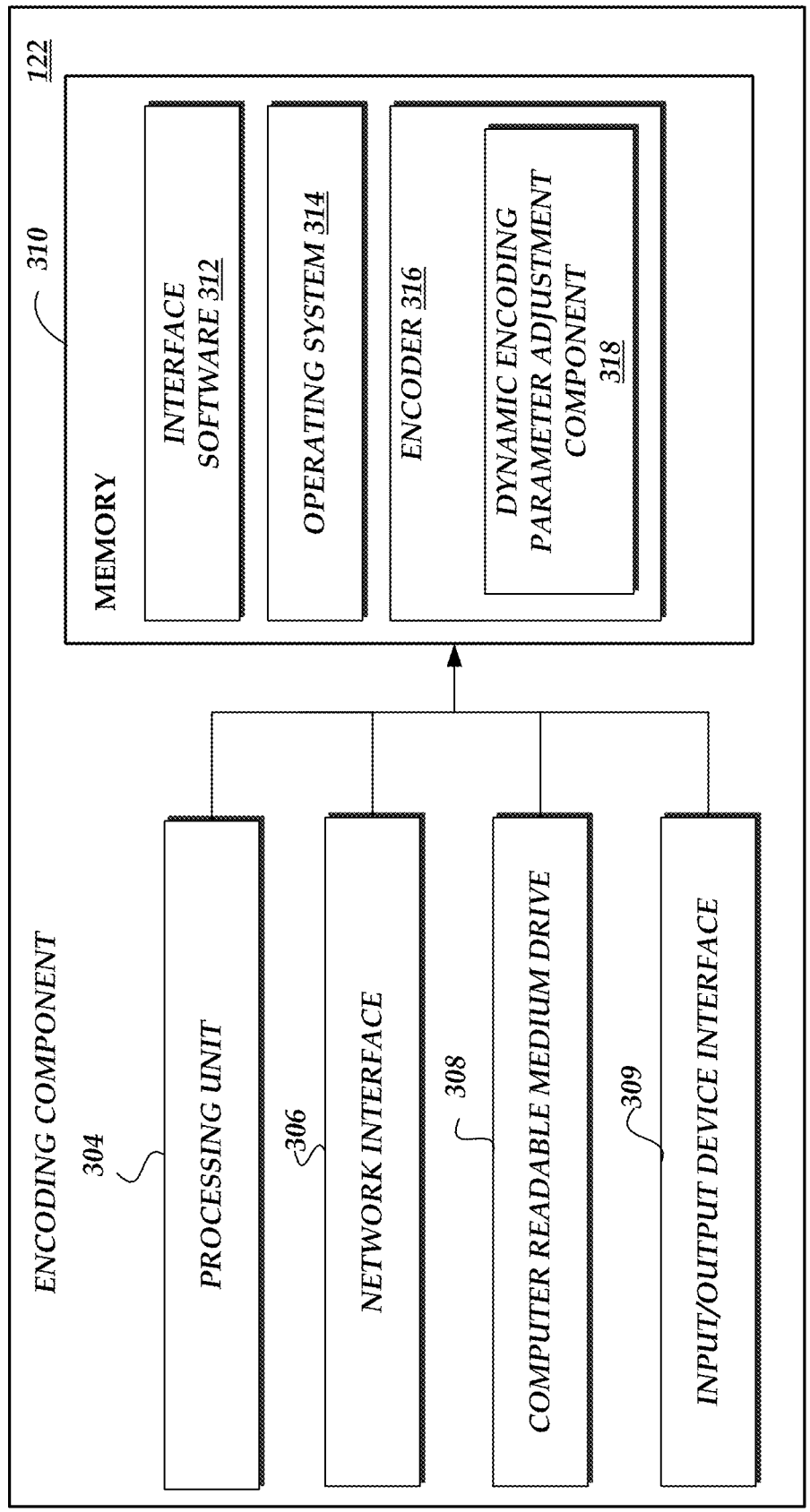
FIG. 3 is a block diagram of illustrative components of an encoder of a packaging and origination service configured to manage dynamic encoder parameters based on digital watermarking configurations in accordance with some embodiments.

FIG. 3 depicts one embodiment of an architecture of an illustrative encoding component 122 for implementing the video packaging and origination service 120 described herein. The general architecture of the encoding component 122 depicted in FIG. 3 includes an arrangement of computer hardware and software components that may be used to implement aspects of the present disclosure. As illustrated, the encoding component 122 of the video packaging and origination service 120 includes a processing unit 304, a network interface 306, a computer readable medium drive 308, an input/output device interface 309, all of which may communicate with one another by way of a communication bus. The components of the encoding component 122 may be physical hardware components or implemented in a virtualized environment.

The network interface 306 may provide connectivity to one or more networks or computing systems, such as the network 150 or network 160 of FIG. 1. The processing unit 304 may thus receive information and instructions from other computing systems or services via a network. The processing unit 304 may also communicate to and from memory 310 and further provide output information for an optional display via the input/output device interface 309. In some embodiments, the encoding component 122 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the video packaging and origination service 120. The memory 310 may further include computer program instructions and other information for implementing aspects of the present disclosure. For example, in one embodiment, the memory 310 includes interface software 312 for receiving and processing content requests from user devices 102. Memory 310 includes an encoder 316 for encoding video segments to be sent to user devices 102 in response to content requests.

As will be described in detail below, the encoder 316 includes a dynamic encoding parameter adjustment component 318 for managing the setting and adjusting of encoding parameters for the encoder 122. Illustratively, the dynamic encoding parameter adjustment component 318 can be utilized to dynamically adjust encoding parameters as described below to modify one or more frames of data during the encoding process. Illustratively, the dynamic adjustment of the encoding parameter is achieved in a manner that distinguishes the encoded content from a typical encoding process or from other encoding process provided by the encoders of the video packaging and origination service 120.

As specified above, in one embodiment, the encoder components 122 illustrated in FIG. 3 can be implemented as physical computing devices or virtualized computing devices in a computing network. In another embodiment, the encoded components 122 may be implemented as logical components in a virtual computing network in which the functionality of the encoder components are implemented by an underlying substrate network of physical computing devices. In this embodiment, the logical encoder components may not be actually instantiated in the physical computing devices of the substrate network. Accordingly, reference to instantiation of the encoder components can correspond to a configuration of physical computing devices functioning as encoder components, instantiation of virtualized computing devices functioning as encoder components or instantiation of logical components in a virtualized network. In each of these examples, the creation, configuration and implementation of the components and the interactions described herein would vary according to the specific instantiation of the encoder component. Thus, aspects of the present application should not be limited to interpretation requiring a physical, virtual, or logical embodiment unless specifically indicated as such.

Figure 4:
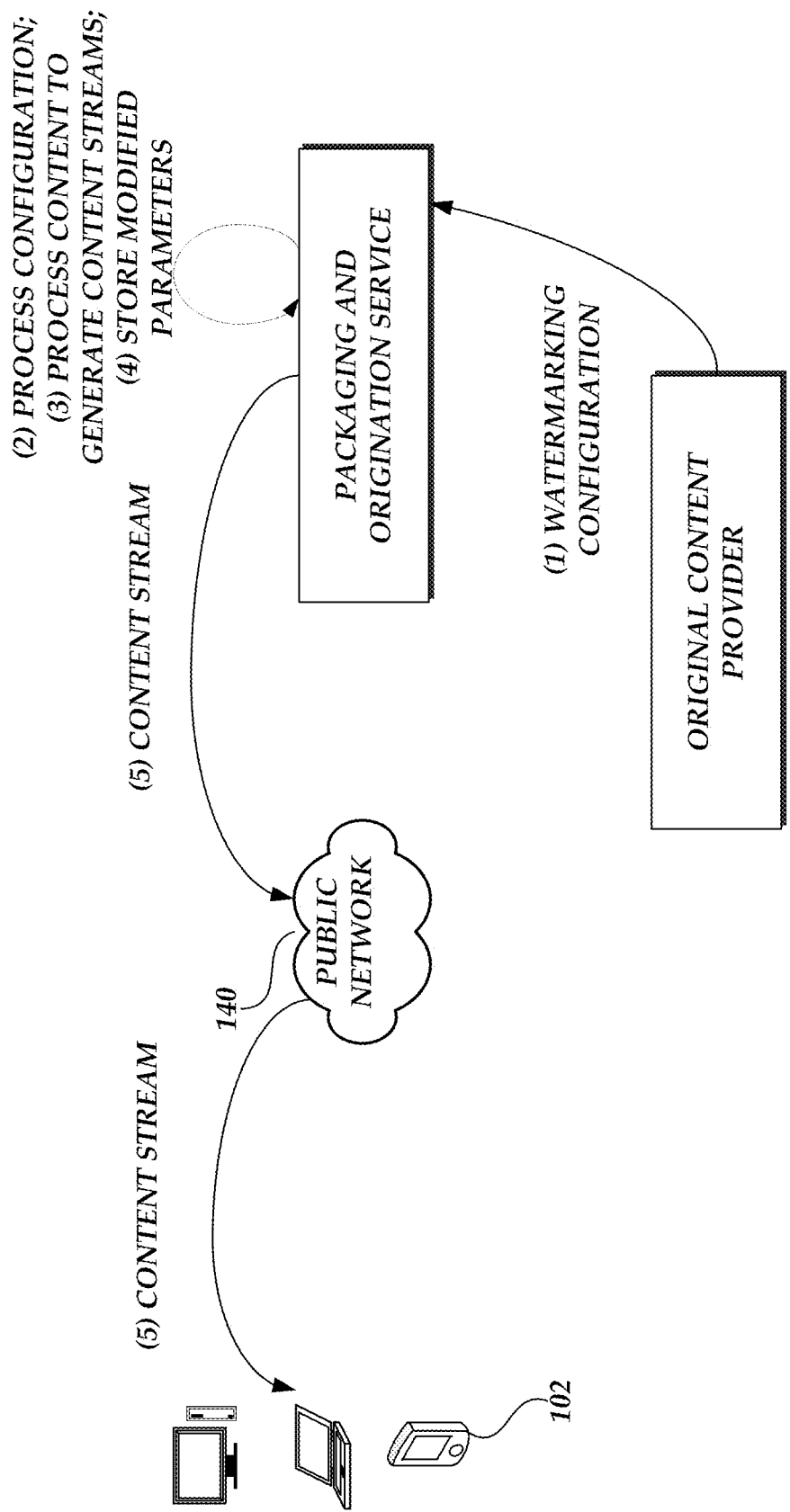
FIG. 4 is a block diagrams of the content delivery environment of FIG. 1 illustrating the interaction in modifying encoder parameters in accordance with some embodiments.

Turning now to FIG. 4, in conjunction with other disclosed interactions, an illustrative interaction for the selection of parameters for encoder components 122 to facilitate watermarking will be described. For purposes of illustration, FIG. 4 illustrate interaction between the components of the video packaging and origination service 120, user devices 102 and original content provider 130. Such interaction is representative in nature and could include a number of additional components or interactions. Additionally, although logically represented as components within the video packaging and origination service 120, one skilled in the relevant art will appreciate that implementation of the components can be accomplished in many ways.

For purposes of illustration, the content request from the user device 102 can be accomplished via access to one or more software applications on the user device to request content, such as streaming content. For example, the user device can generate an interface for receiving user commands or interactions and transmit the request. The initial content request may be transmitted directly to the video packaging and origination service 120 and then sent to a selected content delivery network POP 110. Alternatively, the initial content request may be routed, such as via DNS routing or HTTP-based routing, to a POP 112. For purposes of illustration, the receiving POP 112 may not have a copy of the requested file and may need to retrieve at least a portion of the requested content.

With specific reference to FIG. 4, at (1), the original content provider 130 transmits streaming content in a number of ways from the original content provider 130 to the video packaging and orientation service 120. Included in the transmission of the streaming content, the original content provider 130 can transmit a request to provide watermarking to the encoded content that is provided to user devices or CDN service provider 110. In one aspect, the request to provide watermarking may correspond to a binary specification of whether watermarking should or should not be applied. In another aspect, the request to provide watermarking may correspond to a specification of a type or level of watermarking. For example, the original content provider 130 can specify the number of dynamic parameters that are adjusted or a frequency of adjustment. In still another aspect, the original content provider 130 can specify specific parameters that should be adjusted or how specific parameters should be adjusted. Alternatively, in some embodiments, the video packaging and origination service 120 may be automatically configured to enable watermarking.

At (2), the video packaging and orientation service 120 via the encoder component 122 or management component 124 processes the received content. In one aspect, an ingress component or other processing component can decode incoming content and make it available for encoding and transmission to the user device 102. At the video packaging and orientation service 120, an ingress component or other processing component can decode incoming content and make it available for encoding and transmission to the user device 102. Additionally, the video packaging and origination service 120 determines a set of encoder parameters that may be dynamically modified to enable watermarking based on the configuration information provided by the content provider 130. Illustratively, the video packaging and origination service 120 can select a number of encoding parameters that generally correspond to the encoding of content to generate content streams. Such encoding parameters may be considered independent of the request for watermarking. For example, the video packaging and origination service 120 can select various parameters based on encoding formats based on preferences from the user devices 120, content providers 130, network conditions, or other configurations. Accordingly, the determination of a set of encoder parameters to be dynamically modified can include the modification or biasing of one or more parameters from a value that would have been selected from the encoding parameters independent for watermarking process.

At (3), the encoder component(s) 122 will begin processing original content and generating encoded data streams. Illustratively, the encoder component 122 encodes the content according to one or more encoding profiles (e.g., combinations of encoding bitrate and format) corresponding to the content streams being provided to the requesting entities. As described above, by way of example, examples of encoding formats include but not limited to the motion pictures expert group ("MPEG) MPEG-2 Part 2, MPEG-4 Part 2, H.264 (MPEG-4 Part 10), high efficiency video coding ("HEVC"), Theora, RealVideo RV40, VP9, and AOMedia Video 1 ("AV1"), and the like. Illustratively, during the encoding process, the encoder component 122 typically selects various parameters values defined for the format based on configuration or default values. With reference to some of the previous example, with regard the H.265 encoding format, the encoder component 122 would typically have a configuration in which values for the filtering parameters are selected. Such parameter values may be dictated by the specification of the format, client configuration, content provider specifications or general configuration implemented by the video packaging and origination service 120 and the values can be considered to be independent of the implementation of watermarking as described herein.

To implement watermarking, the encoder component 122 utilizes a watermarking configuration to dynamically modify or bias a parameter value of the encoder that causes a difference in the encoding process. With reference to the immediate example, with regard the H.265 encoding format, the encoder component 122 can modify or bias a filter parameter from a value that would have been otherwise selected for encoding (e.g., a parameter value independent of watermarking). In another example, the encoder component 122 can modify the deblocking strength parameter in the HEVC encoding format that would have been otherwise selected for encoding. The dynamic modification or bias illustratively should be of a sufficient difference such that a processing of the encoded content, such as by a machine learning algorithm, could detect a different value of a parameter that would have been otherwise selected and can then be attributed to watermarking information in the encoded content as described herein.

In some embodiments, the encoder component 122 can dynamically select which parameter may be modified and a value for the modification. In other embodiments, the encoder component 122 can have a configuration that specifies the parameter to be modified but the encoder component 122 dynamically selects the value for the parameter or utilizes a bias that results in a different value. For example, the encoder component 122 can be biased such that a selected parameter value is mathematically modified to arrive at a different, acceptable value (e.g., a multiplier, addition, subtraction, etc.). Still further, in other embodiments, the encoder component 122 can have a configuration that specifies the parameter to be modified and the value for the modification. Illustratively, the encoder components 122 can dynamically select parameter values in a number of ways, such as selecting parameters values within a defined range, random selection, or selection of predetermined values from a set of defined parameter values. For example, the encoders 122 can be configured according to a matrix of values in which values may selected based on evaluation of different criteria.

As described above, in addition to configuring the encoder component 122 regarding how parameters may be dynamically selected, the encoder components 122 can also be configured to determine a frequency for how often encoder parameters will be modified. The frequency of the modification can be based on a specifying a number of times a modification will occur within encoded content, such as a number of modifications for a specified amount of time or for the entire encoding process. The frequency of the modification can also be based on specifying the type and number of frames or other measure of encoding. For example, the encoder can be configured to modify one or more non-reference frames occurring within a defined period of time (e.g., modify at least one non-reference frame occurring within the first 60 seconds of content). The frequency of modification may be a configuration that facilitates the number of modification instances that can be used to positively identify the source of a redistribution.

In one embodiment, the combination of frequency, parameters or parameter values can be utilized to represent a unique code, such as user identifier. More specifically, the encoder component 122 can be configured to take specific user identifiers, such as unique coders, and translate the codes into a set of instructions that correspond to the modification of the parameters as defined by at least one of the frequency, specified parameter or parameter values.

At (4), the video packaging and origination service 120 stores the selected parameter values or other information that can be utilized to identify the specific content streams in subsequent transaction. Illustratively, the video packaging and origination service 120 can store the values of the biased/modified parameter values as well as the parameter values that would have been otherwise selected during the encoding process. In some embodiments, if the selection of the modified or biased parameters values correspond to a schedule or set of instructions, the video packaging and origination service can store the correlation of identifiers with the schedule or set of instructions (e.g., user identifier x corresponds to the fifth value in the schedule). At (5), the video packaging and orientation service 120 generates content streams as a transmission of encoded content segments.

Illustratively, the interaction of FIG. 4 can continue throughout the transmission of encoded content in which the video packaging and orientation service 120. If the source of encoded content that has been redistributed is required, the video packaging and origination service 120

Figure 5:
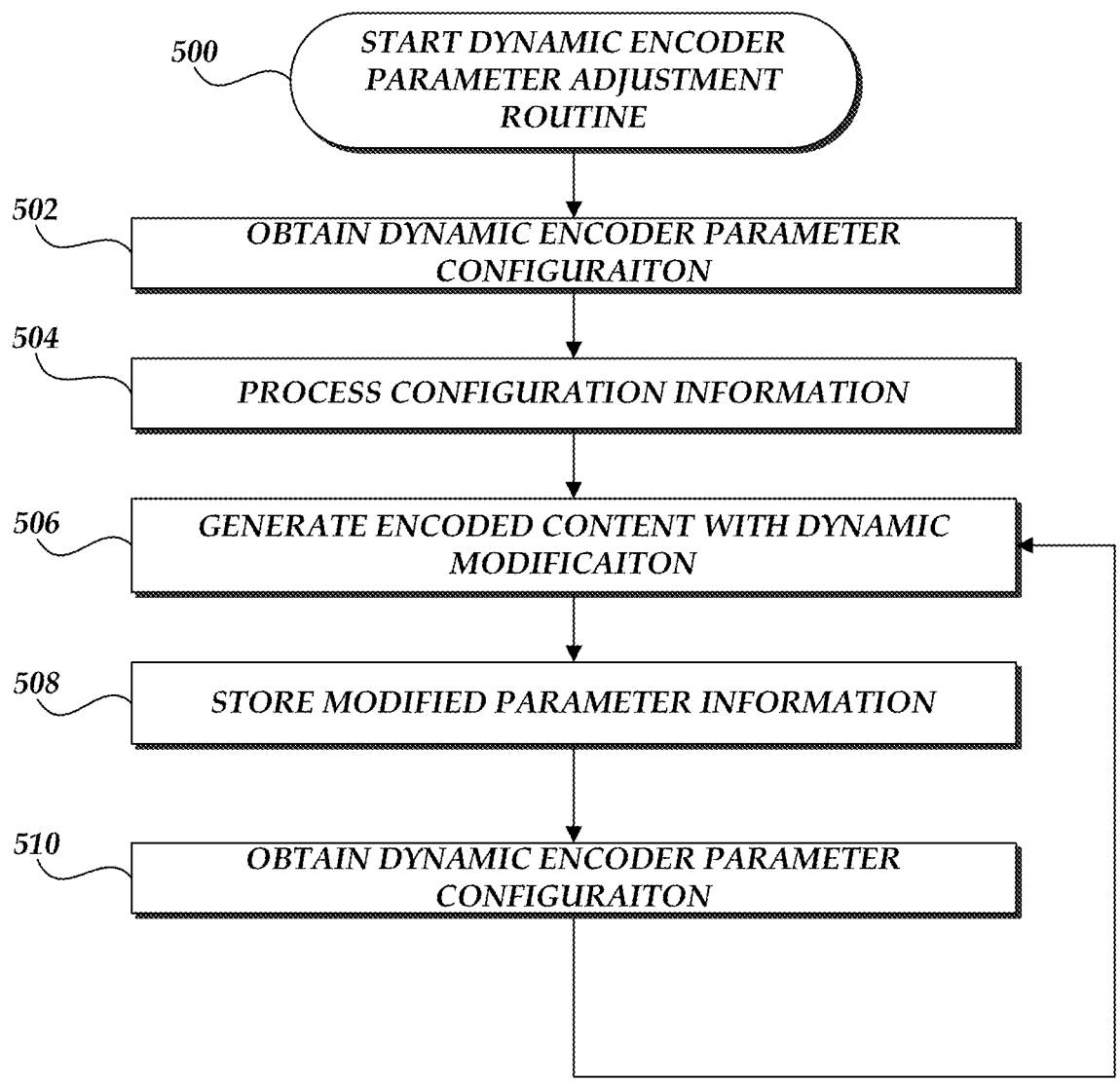
FIG. 5 is a flow diagram illustrative of a dynamic encoder parameter adjustment routine implemented by a video packaging and origination system in accordance with some embodiments.

Turning now to FIG. 5, a routine 500 for processing dynamic encoder parameter adjustments will be described. Illustratively, routine 500 will be described with regard to implementation by the video packaging and origination service 120 through the encoder component 122 or management component 124. Routine 500 illustratively occurs after the video packaging and origination service 120 has received a requesting entity request for streaming content and an original content provider 130 has provided the requested content to the video packaging and origination service 120 for encoding.

At block 502, the video packaging and orientation service 120 obtains content from the original content provider 130. As described above, illustratively, in the transmission of the streaming content, the original content provider 130 can transmit a request to provide watermarking to the encoded content that is provided to user devices or CDN service provider 110. In one aspect, the request to provide watermarking may correspond to a binary specification of whether watermarking should or should not be applied. In another aspect, the request to provide watermarking may correspond to a specification of a type or level of watermarking. For example, the original content provider 130 can specify the number of dynamic parameters that are adjusted or a frequency of adjustment. In still another aspect, the original content provider 130 can specify specific parameters that should be adjusted or how specific parameters should be adjusted. Alternatively, in some embodiments, the video packaging and origination service 120 may be automatically configured to enable watermarking.

At block 504, the video packaging and orientation service 120 via the encoder component 122 or management component 124 processes the received content. In one aspect, an ingress component or other processing component can decode incoming content and make it available for encoding and transmission to the user device 102. At the video packaging and orientation service 120, an ingress component or other processing component can decode incoming content and make it available for encoding and transmission to the user device 102. Additionally, the video packaging and origination service 120 determines a set of encoder parameters that may be dynamically modified to enable watermarking based on the configuration information provided by the content provider 130. Illustratively, the video packaging and origination service 120 can select a number of encoding parameters that generally correspond to the encoding of content to generate content streams. Such encoding parameters may be considered independent of the request for watermarking. For example, the video packaging and origination service 120 can select various parameters based on encoding formats based on preferences from the user devices 120, content providers 130, network conditions, or other configurations. Accordingly, the determination of a set of encoder parameters to be dynamically modified can include the modification of one or more parameters from a value that would have been selected from the encoding parameters independent for watermarking or the At block 506, the encoder component(s) 122 will begin processing original content and generating encoded data streams. Illustratively, the encoder component 122 encodes the content according to one or more encoding profiles (e.g., combinations of encoding bitrate and format) corresponding to the content streams being provided to the requesting entities. As described above, by way of example, examples of encoding formats include but not limited to the motion pictures expert group ("MPEG) MPEG-2 Part 2, MPEG-4 Part 2, H.264 (MPEG-4 Part 10), high efficiency video coding ("HEVC"), Theora, RealVideo RV40, VP9, and AOMedia Video 1 ("AV1"), and the like. As described above, during the encoding process, the encoder component 122 typically selects various parameters values defined for the format based on configuration or default values. With reference to some of the previous example, with regard the H.265 encoding format, the encoder component 122 would typically have a configuration in which values for the filtering parameters are selected. Such parameter values may be dictated by the specification of the format, client configuration, content provider specifications or general configuration implemented by the video packaging and origination service 120 and the values can be considered to be independent of the implementation of watermarking as described herein.

To implement watermarking, the encoder component 122 utilizes a watermarking configuration to dynamically modify or bias a parameter value of the encoder in a manner that can be identified. For example, with regard the H.264 encoding format, the encoder component 122 can modify a filter parameter from a value that would have been otherwise selected for encoding (e.g., a parameter value independent of watermarking. In another example, the encoder component 122 can modify the deblocking strength parameter, frame distance prediction, filtering parameters (e.g., sample adaptive offset parameters) in the HEVC encoding format.

In some embodiments, the encoder component 122 can dynamically select which parameter may be modified or biased and a value for the modification/bias. In other embodiments, the encoder component 122 can have a configuration that specifies the parameter to be modified but the encoder component 122 dynamically selects the value for the parameter. Still further, in other embodiments, the encoder component 122 can have a configuration that specifies the parameter to be modified and the value for the modification. Illustratively, the encoder components 122 can dynamically select parameter values in a number of ways, such as selecting values within a defined range, random selection, or selection of predetermined values. For example, the encoders 122 can be configured according to a matrix of values in which values may selected based on evaluation of different criteria.

As described above, in addition to configuring the encoder component 122 regarding how parameters may be dynamically selected, the encoder components 122 can also be configured to determine a frequency for how often encoder parameters will be modified. The frequency of the modification can be based on a specifying a number of times a modification will occur within encoded content, such as a number of modifications for a specified amount of time or for the entire encoding process. The frequency of the modification can also be based on specifying the type and number of frames or other measure of encoding. For example, the encoder can be configured to modify one or more non-reference frames occurring within a defined period of time (e.g., modify at least one non-reference frame occurring within the first 60 seconds of content). The frequency of modification may be a configuration that facilitates the number of modification instances that can be used to positively identify the source of a redistribution.

In one embodiment, the combination of frequency, parameters or parameter values can be utilized to represent a unique code, such as user identifier. More specifically, the encoder component 122 can be configured to take specific user identifiers, such as unique coders, and translate the codes into a set of instructions that correspond to the modification of the parameters as defined by at least one of the frequency, specified parameter or parameter values.

At block 510, the video packaging and origination service 120 stores the selected parameter values or other information that can be utilized to identify the specific content streams in subsequent transaction. At (5), the video packaging and orientation service 120 generates content streams as a transmission of encoded content segments. As illustrated in FIG. 5, routine 500 continues throughout the transmission of encoded content in which the video packaging and orientation service 120 continuously dynamically updates the encoder component parameters by repeating blocks 506 and 508.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system to encode content comprising:
one or more computing devices associated with a video encoder component, wherein the video encoder component is configured to:
receive content to be encoded according to an encoding profile associated with a set of encoding parameters;
encode the content to be encoded to form content streams based in accordance with the set of encoding parameters, wherein encoding the content includes dynamically modifying an encoding parameter associated with a non-reference frame;
store the dynamically modified encoding parameter;
transmit the content streams;
compare the dynamically modified encoding parameter with encoding parameters of a subsequent transmission of the content streams; and
identify a source of redistribution based on the comparison.

2. The system of claim 1, wherein the video encoder component is further configured to determine a frequency to dynamically modify the encoding parameter.

3. The system of claim 1, wherein the video encoder component is further configured to determine a parameter to modify.

4. The system of claim 3, wherein the video encoder component is further configured to select a value from the determined parameter to modify.

5. The system of claim 4, wherein selecting the value from the determined parameter to modify includes at least one of a selecting from a range of values or selecting from a set of predefined values.

6. A computer-implemented method for managing encoder components comprising:
receiving a request for encoded content;
dynamically modifying an encoding parameter associated with a non-reference frame during an encoding process, the modified encoding parameter based on a watermarking configuration;
storing the dynamically modified encoding parameter;
transmitting content streams responsive to the request, wherein the content streams are at least in part based on the dynamically modified encoding parameter;
comparing the dynamically modified encoding parameter with a dynamically modified encoding parameter of a subsequent transmission of the content streams; and
responsive to the comparison, identifying a source of the subsequent transmission.

7. The computer-implemented method of claim 6 further comprising receiving the watermarking configuration.

8. The computer-implemented method of claim 7, wherein receiving the watermarking configuration includes receiving the watermarking configuration from a content provider.

9. The computer-implemented method of claim 6, wherein the watermarking configuration includes a specification of a frequency of dynamic modification.

10. The computer-implemented method of claim 9, wherein the frequency of dynamic modification is based on a defined time window.

11. The computer-implemented method of claim 9, wherein the frequency of dynamic modification is based on a number of frames of encoded content.

12. The computer-implemented method of claim 6 further comprising storing information associated with a dynamically modified parameter value.

13. The computer-implemented method of claim 6, wherein at least one of a frequency of dynamic modification, parameter, or parameter value corresponds to a representation of a unique identifier.

14. The computer-implemented method of claim 6, wherein the watermarking configuration includes a specification of a parameter to modify.

15. The computer-implemented method of claim 14, wherein the watermarking configuration includes a specification of values for the specified parameter to modify.

16. A computer-implemented method to deliver content comprising:
receiving a request for encoded content;
configuring an encoder to bias an encoding parameter associated with a non-reference frame, the biased encoding parameter based on a watermarking configuration;
storing the biased encoding parameter;
transmitting content streams responsive to the request, wherein the content streams are at least in part based on the biased encoding parameter;
comparing the biased encoding parameter with a biased encoding parameter of subsequent transmissions of the content streams; and
identifying a user device sourcing the subsequent transmissions in response to the comparison.

17. The computer-implemented method of claim 16, wherein the watermarking configuration includes a specification of at least one of a frequency of bias or parameter to modify.

18. The computer-implemented method of claim 17, wherein the frequency of bias corresponds to an importance level of the encoded content.

19. The computer-implemented method of claim 16 further comprising storing a result of the biased encoding parameter.

20. The computer-implemented method of claim 16, wherein configuring the encoder to bias the encoding parameter based on the watermarking configuration includes configuring the encoder to select parameter values based on a defined range, random selection, or selection of predetermined values.

* * * * *